Feb. 18, 1930.  A. C. WUBBENHORST  1,747,689
MEANS FOR SEPARATING ELEMENTS FROM SHAFTS
Filed July 16, 1925
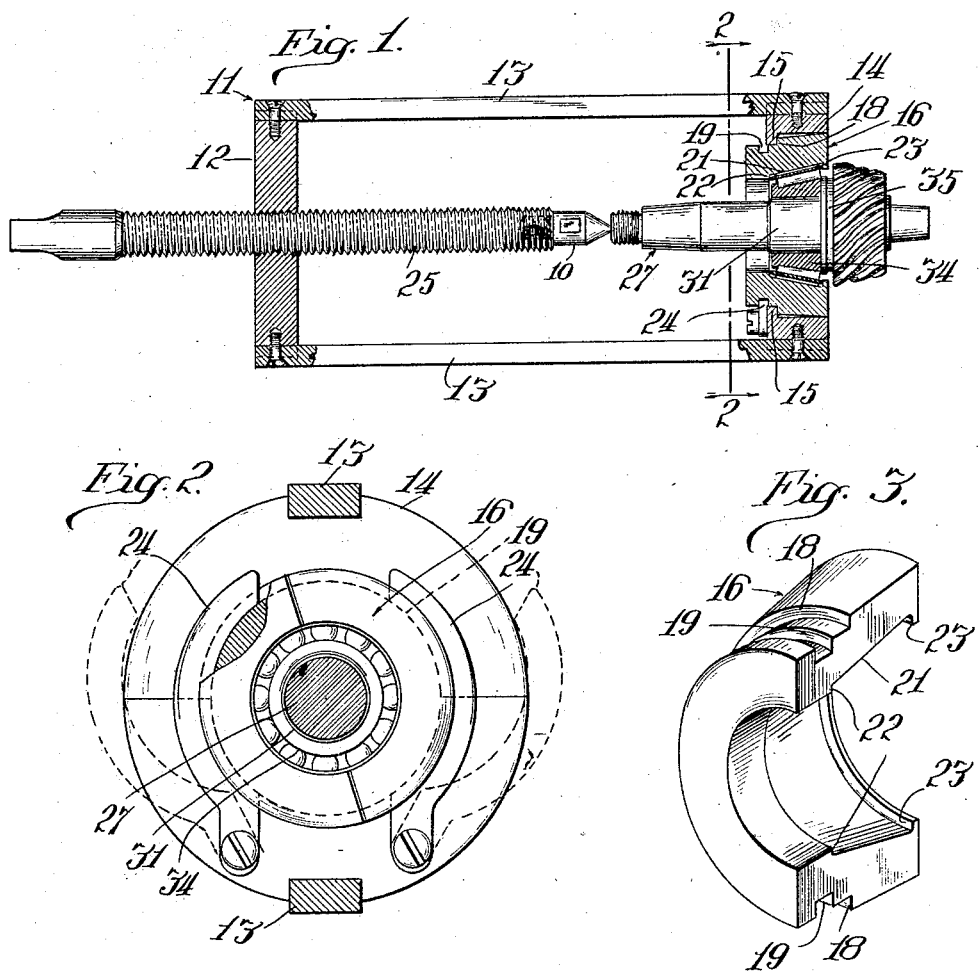
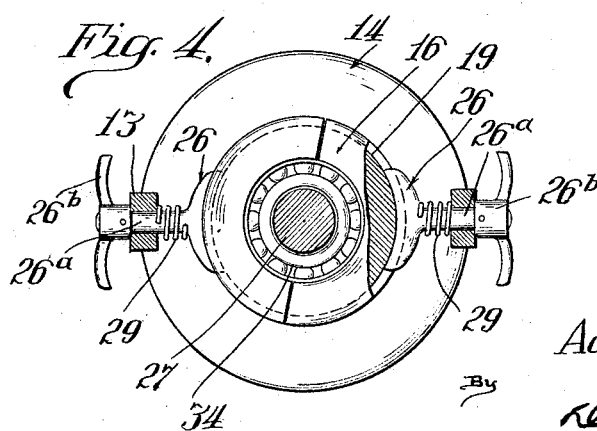
Inventor
Adolph C. Wubbenhorst Patented Feb. 18, 1930

1,747,689

UNITED STATES PATENT OFFICE

ADOLPH C. WUBBENHORST, OF CHICAGO, ILLINOIS

MEANS FOR SEPARATING ELEMENTS FROM SHAFTS

Application filed July 16, 1925. Serial No. 44,015.

The invention relates to means for separating elements from shafts generally and particularly to pullers adapted to remove nonfriction bearings such as ball, or roller bearing from shafts.

The invention is particularly useful in pulling bearings from shafts that have a pinion or gear abutting the bearing to be pulled, which can not be readily gotten at with a drift or the like.

In using a drift or chisel the gear teeth or annular shoulder formed near the teeth is likely to be injured and it is almost a certainty that the bearing will be ruined in forcing it loose from the shaft due to the breaking or bending of the race.

An object of the invention is to provide a tool that is simple of manufacture and operation, and adaptable to remove bearings or the like from shafts.

Another object of the invention is to provide a puller that is adaptable to pull bearings, varying in size, from shafts.

Another object of the invention is to provide an attached pressure producing means having a hardened renewal end.

Another object of the invention is to provide a bearing puller that will remove bearings from shafts without injuring them or other parts mounted on the shaft such as pinions, and finds a wide field of utility for other purposes.

In the drawings in which a preferred embodiment is illustrated:

Fig. 1 is an elevation partly in section, of the puller showing a roller bearing in place ready to be separated.

Fig. 2 is a section taken on lines 2—2 of Fig. 1 viewed in the direction of the arrows.

Fig. 3 is a perspective view of one segment of the bearing holder.

Fig. 4 is a view similar to that shown in Fig. 2 showing a modified form of locking means.

A frame or yoke 11 is made up, as best illustrated in Fig. 1, of a cross bar 12, to the end of which is secured member 13. These members are fitted into grooves in said cross bar 12 and secured thereto by countersunk filister head cap screws or the like.

To the other ends of these members 13 a collar 14 is secured, in the same manner as the cross bar 12. An internal annular flange 15 is formed at the upper end of said collar to engage a shoulder on a bearing holder which will presently be described.

This frame or yoke 11 comprising cross bar 12, members 13 and collar 14, may be cast in one piece if desired, or the cross bar 12 and member 13 be cast in one piece and the collar made separately.

The part 16 which I have termed a bearing holder is made in halves but may be made in as many sections as found convenient. Its outer periphery is turned tapered, to provide for its easy insertion into the ring 14 and preferably, its greatest external diameter is slightly smaller than the smallest diameter of the ring.

An annular shoulder 18 is turned on said bearing holder 16, to engage the flange 15, on the ring or collar 14, to prevent axial displacement in an inward direction while setting the device and at the same time centering it and holding it against radial displacement.

An annular groove 19 is turned in the bearing holder 16. The outer surface of said groove is substantially flush with the inner face of the ring 14 when assembled, upon which, pivoted locking means is mounted, which means will hereinafter be further described.

The bearing holder 16 has a tapered core or back cut 21 to fit the bearing to be pulled, forming annular shoulders 22 and 23 at the inner and outer ends of said holder respectively. In practice a number of bearing holders to fit the various sizes of bearing is supplied with the frame in which the diameter of this back cut 21 and these shoulders 22 and 23 vary with the size of the bearing to be pulled.

A pair of arcuate locking members 24, having their inner sides of a diameter substantially equal to the diameter of the groove 19 are pivotally secured to the inwardly facing surface of the ring 14, disposed to engage said groove 19 and hold said bearing holder locked to said ring 14.

A jack screw 25 threadingly engages a tapped hole provided in cross bar 12, concentric with the ring or collar 14. The upper end of said jack screw is of polygonal cross section to receive a wrench or crank for operating it, while the other end of said jack screw is tapped, to receive a tapered case hardened centering element 10, which has its sides flattened to be engaged by a wrench for securing it in place.

It sometimes happens that the center in shaft 27 becomes burred, or otherwise injured. In that case the centering element may not register with the true center thus injuring the jack screw after applying pressure in which case the renewable center may be replaced without the expense of furnishing a complete new jack screw.

In the modified form of locking means illustrated in Fig. 4, comprising arcuate members 26 each having a stem 26ª formed integral therewith, to extend through apertures in the members 13; a thumb nut 26ᵇ is fixedly secured to each, to limit the inward thrust of the lock, produced by the compression springs 29, surrounding the stems 26ª and confined between the members 13 and arcuate members 26.

The short shaft 31 has a roller bearing 34 securely pressed on it and a pinion of the spiral class having a collar 35 formed thereon as is customary in gears of this class secured to said shaft against said bearing in any approved manner.

To utilize the device the bearing holder segments 16, having a cut back portion to fit the bearing to be pulled, are placed around said bearing. The bearing holder 16 is then inserted into the ring 14 from the outer side, until the shoulder 18 on said holder is arrested, by the internal flange 15 on the ring. The locking elements 26 are then brought into locking engagement with said bearing holder.

The jack screw 25 is then forced downwardly into engagement with the gear shaft 31. As pressure is produced on said gear shaft by the jack screw it is resisted by the shoulder 23 engaging the bearing from which it is obvious that the shaft will be gradually forced outwardly out of engagement with the bearing.

I do not intend to be limited to the particular details herein shown and described, but to take advantage of all the forms falling within what is claimed.

Having described my invention what I claim is:

1. In a device of the class described, a yoke having a collar at one end forming a frame, a jack screw carried in the end of said yoke, bearing securing means removably fitted in said collar, and pivotally mounted locking means on said collar arranged to hold said bearing receiving means in engagement with said collar.

2. In a device of the class described, a jack screw arranged to engage a shaft carrying a bearing, a bearing holder, means for carrying said bearing holder and jack screw, and pivoted means on said carrying means for locking said bearing holder to said means for carrying said bearing holder and jack screw.

3. In a device of the class described, a yoke provided at one end with a detachable collar formed with an internal flange, pressure producing means carried by the opposite end of said yoke, a bearing holder carried in said collar and formed with a shoulder arranged to engage said flange, and pivotally mounted means on said collar for locking said bearing holder against axial displacement.

4. In a device of the class described, a yoke, pressure producing means carried by said yoke, a divided bearing holder, means for carrying said bearing holder, pivoted means on said last named means for locking said divided bearing holder against axial displacement.

5. In a device of the class described, a yoke, pressure producing means mounted on said yoke, a divided bearing holder, means integral with said yoke for holding said divided bearing holder against radial displacement, and against axial displacement in one direction, and pivoted means for locking said bearing holder against axial displacement in either direction.

6. In a device of the class described, a yoke provided at one end with a collar formed with a flange, pressure producing means carried by the yoke end opposite said collar, a bearing holder carried in said collar and formed with a shoulder arranged to engage said flange, there being a pair of shoulders on said bearing holder forming an annular groove, locking means pivotally mounted on said collar arranged to engage said groove to hold said bearing holder against axial pressure of the pressure producing means.

7. In a device of the class described, a yoke having a collar at one end, a jack screw carried in the opposite end of the yoke, a centering element detachably secured to said jack screw, bearing receiving means mounted in said collar adapted to carry a bearing mounted on a shaft and means arranged to hold said bearing receiving means locked to said collar.

8. In a device of the class described, a jack screw having an axial tapped opening, a centering element having one end of reduced threaded diameter forming a shoulder, said reduced portion engaging said tapped opening and said shoulder engaging the end of said jack screw to take the thrust load, said jack screw being arranged to engage a shaft carrying a bearing, a bearing holder for said bearing, means for carrying said bearing holder and jack screw, and means for locking said bearing holder to said means for carrying said bearing holder and jack screw.

In testimony whereof I affix my signature at 10 So. La Salle Street, Chicago, Illinois.

ADOLPH C. WUBBENHORST.